(12) United States Patent
Kitano et al.

(10) Patent No.: US 6,569,950 B2
(45) Date of Patent: May 27, 2003

(54) PROCESS FOR PRODUCING ACID MODIFIED POLYPROPYLENE RESIN

(75) Inventors: Katsuhisa Kitano, Ichihara (JP); Takashi Sanada, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/043,089

(22) Filed: Jan. 14, 2002

(65) Prior Publication Data
US 2002/0161131 A1 Oct. 31, 2002

(30) Foreign Application Priority Data

| Feb. 28, 2001 | (JP) | ........................................ 2001-053964 |
| Apr. 18, 2001 | (JP) | ........................................ 2001-119305 |

(51) Int. Cl.$^7$ ...................... C08F 267/04; C08F 255/02
(52) U.S. Cl. .................. 525/285; 525/263; 525/273; 525/240; 525/309; 525/322
(58) Field of Search .................... 525/285, 74, 263, 525/273, 240, 322, 309

(56) References Cited

U.S. PATENT DOCUMENTS 5,439,974 A * 8/1995 Mattson ..................... 525/74
5,962,594 A 10/1999 Raetzsch et al.

FOREIGN PATENT DOCUMENTS

| EP | 0 370 735 A2 | 5/1990 |
| JP | 61-155436 A | 7/1986 |
| JP | 5-179138 A | 7/1993 |

* cited by examiner

Primary Examiner—James J. Seidleck
Assistant Examiner—Olga Asinovsky
(74) Attorney, Agent, or Firm—Sughrue Mion, PLLC

(57) ABSTRACT

There is provided a process for producing an acid modified polypropylene resin, which comprises the step of kneading:

(1) 100 parts by weight of a polypropylene resin (A),
(2) 0.1 to 20 parts by weight of an unsaturated carboxylic acid or a derivative thereof (B),
(3) 0.01 to 20 parts by weight of an organic peroxide (C) having a decomposition temperature of from 50 to 120° C., at which a half-life of the organic peroxide is 1 minute, and
(4) optionally, 0.01 to 20 parts by weight of an organic peroxide (D) having a decomposition temperature of from 150 to 200° C., at which a half-life of the organic peroxide is 1 minute.

6 Claims, No Drawings

PROCESS FOR PRODUCING ACID MODIFIED POLYPROPYLENE RESIN

FIELD OF THE INVENTION

The present invention relates to a process for producing an acid modified polypropylene resin. More specifically, the present invention relates to (i) a process for producing an acid modified polypropylene resin, according to which process (a) lowering of a molecular weight of a polypropylene resin during a production procedure can be diminished, thereby obtaining an acid modified polypropylene resin having a high molecular weight, (b) an amount of a grafted unsaturated carboxylic acid or a grafted derivative thereof in the obtained acid modified polypropylene resin can be increased, and moreover (c) the productivity of the obtained acid modified polypropylene resin can be increased, and (ii) a process for producing an acid modified polypropylene resin, according to which process (a) an amount of a grafted unsaturated carboxylic acid or a grafted derivative thereof in the obtained acid modified polypropylene resin can be increased, and moreover (b) the productivity of the obtained acid modified polypropylene resin can be increased.

BACKGROUND OF THE INVENTION

In order to make use of characteristic features of a polypropylene resin, said resin is blended or alloyed with a different kind of a polymer, or is combined with an inorganic material to obtain a composite material, or is laminated with a metal.

However, the polypropylene resin has problems that (i) its adhesive property to an inorganic material or a metal is not satisfactory, and (ii) its compatibility with a different kind of a polar group-carrying polymer such as a polyester resin, a polyamide resin, a polyphenylene sulfide resin and a polyphenylene oxide resin is low, and therefore (a) a polymer alloy obtained is insufficient in its impact resistance and mechanical strength, and moreover (b) a surface of an article molded from the alloy is peeled easily.

In order to solve such problems, a modified polypropylene resin has been used. As a process for producing such a modified polypropylene resin, there is known a process comprising the steps of (1) melt-kneading a polypropylene resin, an unsaturated carboxylic acid or a derivative thereof and an organic peroxide in an extruder, and (2) grafting the unsaturated carboxylic acid or the derivative thereof to the polypropylene resin.

However, the present inventors have found that said process has a problem that when a large amount of the organic peroxide is used to increase an amount of a grafted unsaturated carboxylic acid or a grafted derivative, a molecular weight of the polypropylene resin is remarkably lowered during the melt-kneading, and thereby a molecular weight of the grafted polypropylene resin is also remarkably lowered.

In order to diminish remarkable lowering of the molecular weight of the grafted polypropylene resin, there are known (1) a process comprising the step of melt-kneading the above-mentioned components in the presence of styrene ("Design of Practical Polymer Alloy" by Fumio Ide, page 51, edited by KOGYO CHOSAKAI PUBLISHING CO. LTD. (1996)), and (2) a process comprising the step of melt-kneading the above-mentioned components in the presence of divinylbenzene (JP-A 7-173229). However, such processes have a problem that lowering of the molecular weight cannot be sufficiently diminished.

SUMMARY OF THE INVENTION

An object of the present invention is to provide a process for producing an acid modified polypropylene resin, according to which process (a) lowering of a molecular weight of a polypropylene resin during a production procedure can be diminished, thereby obtaining an acid modified polypropylene resin having a high molecular weight, (b) an amount of a grafted unsaturated carboxylic acid or a grafted derivative thereof in the resulting acid modified polypropylene resin can be increased, and moreover (c) the productivity of the resulting acid modified polypropylene resin can be increased.

Another object of the present invention is to provide a process for producing an acid modified polypropylene resin, according to which process (a) an amount of a grafted unsaturated carboxylic acid or a grafted derivative thereof in the resulting acid modified polypropylene resin can be increased, and moreover (b) the productivity of the resulting acid modified polypropylene resin can be increased.

The present inventors have undertaken extensive studies on a process for producing an acid modified polypropylene resin. As a result, it has been found that the above-mentioned objects can be accomplished by using a specific organic peroxide, or using a combination of two kinds of a specific organic peroxide, and thereby, the present invention has been obtained.

The present invention provides a process for producing an acid modified polypropylene resin, which comprises the step of kneading:

(1) 100 parts by weight of a polypropylene resin (A),
(2) 0.1 to 20 parts by weight of an unsaturated carboxylic acid or a derivative thereof (B), and
(3) 0.01 to 20 parts by weight of an organic peroxide (C) having a decomposition temperature of from 50 to 120° C., at which a half-life of the organic peroxide is 1 minute.

According to this process, (a) lowering of a molecular weight of the polypropylene resin during a production procedure can be diminished, thereby obtaining an acid modified polypropylene resin having a high molecular weight, (b) an amount of a grafted unsaturated carboxylic acid or a grafted derivative thereof in the resulting acid modified polypropylene resin can be increased, and moreover (c) the productivity of the resulting acid modified polypropylene resin can be increased.

The present invention also provides a process for producing an acid modified polypropylene resin, which comprises the step of kneading:

(1) 100 parts by weight of a polypropylene resin (A),
(2) 0.1 to 20 parts by weight of an unsaturated carboxylic acid or a derivative thereof (B),
(3) 0.01 to 20 parts by weight of an organic peroxide (C) having a decomposition temperature of from 50 to 120° C., at which a half-life of the organic peroxide is 1 minute, and
(4) 0.01 to 20 parts by weight of an organic peroxide (D) having a decomposition temperature of from 150 to 200° C., at which a half-life of the organic peroxide is 1 minute.

According to this process, (a) an amount of a grafted unsaturated carboxylic acid or a grafted derivative thereof in the resulting acid modified polypropylene resin can be increased, and moreover (b) the productivity of the resulting acid modified polypropylene resin can be increased.

DETAILED DESCRIPTION OF THE INVENTION

The "polypropylene resin" (component (A)) used in the present invention means a propylene homopolymer; a random copolymer of propylene and ethylene, which copolymer has 50 to 99.9% by weight of a polymerized propylene unit (said unit is hereinafter referred to as "propylene unit"); a random copolymer of propylene and an α-olefin having 4 to 12 carbon atoms, which copolymer has 50 to 99.9% by weight of a propylene unit; a heterophasic copolymer of propylene and ethylene, which copolymer has 50 to 99.9% by weight of a propylene unit; a block copolymer comprising a segment of a propylene homopolymer and another segment of a propylene/ethylene random copolymer, which block copolymer has 50 to 99.9% by weight of a propylene unit; or a mixture of two or more polymers mentioned above. Of these, preferred are the propylene homopolymer and the heterophasic copolymer of propylene and ethylene.

The above-mentioned "heterophasic copolymer of propylene and ethylene" means a copolymer obtained by a process comprising the steps of (1) polymerizing propylene to obtain a propylene homopolymer, and (2) copolymerizing propylene and ethylene in the presence of the propylene homopolymer obtained in the above step. In the copolymer obtained, there is no substantial chemical bond between the propylene homopolymer and the copolymer of propylene and ethylene. The copolymer is explained in "Polypropylene Handbook", by Edward P. Moore, Jr., pages 5 and 92, edited by HANSER Co. Incidentally, the copolymer is usually called a "block PP" or a "block polypropylene" in the business of polypropylene.

Examples of the above-mentioned α-olefin are 1-butene, 2-methyl-1-propene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, methyl-1-hexene, dimethyl-1-pentene, ethyl-1-pentene, trimethyl-1-butene, methylethyl-1-butene, 1-octene, methyl-1-pentene, ethyl-1-hexene, dimethyl-1-hexene, propyl-1-heptene, methylethyl-1-heptene, trimethyl-1-pentene, propyl-1-pentene, diethyl-1-butene, 1-nonene, 1-decene, 1-undecene and 1-dodecene.

The "unsaturated carboxylic acid or a derivative thereof" (component (B)) used in the present invention means the following compound (1) or compound (2) or a combination thereof.

(1) A compound having both (i) at least one unsaturated group and (ii) at least one carboxyl group or a group derived therefrom in the molecule.

(2) A compound capable of changing to a compound having both (i) at least one unsaturated group and (ii) at least one carboxyl group or a group derived therefrom in the molecule during the kneading step through a reaction such as dehydration.

In the present invention, the component (B) reacts with the polypropylene resin (component (A)) in the kneading step to produce the acid modified polypropylene resin. In the present invention, such a reaction is referred to as a "graft reaction".

Examples of the above-mentioned unsaturated group are a carbon—carbon double bond and a carbon—carbon triple bond.

Examples of the above-mentioned group derived from the carboxyl group are a functional group such as salts, esters, acid amides, acid anhydrides, imides, acid azides, acid halides, oxazolines and nitrites, which are formed by substituting the hydrogen atom or hydroxyl group of the carboxyl group; an epoxy group; an amino group; a hydroxyl group; and an isocyanate group.

Examples of the component (B) are unsaturated carboxylic acids, unsaturated carboxylic acid derivatives, unsaturated epoxy compounds, unsaturated alcohols, unsaturated amines and unsaturated isocyanates. Specific examples of the above-mentioned compound (1) are maleic acid, fumaric acid, itaconic acid, acrylic acid, methacrylic acid, maleic anhydride, itaconic anhydride, methyl acrylate, ethyl acrylate, butyl acrylate, glycidyl acrylate, methyl methacrylate, ethyl methacrylate, butyl methacrylate, glycidyl methacrylate, monoethyl maleate, diethyl maleate, monomethyl fumarate, dimethyl fumarate, acrylamide, methacrylamide, maleic monoamide, maleic diamide, fumaric monoamide, maleimide, N-butylmaleimide and sodium metharylate. Specific examples of the above-mentioned compound (2) are citric acid and malic acid. Preferred compounds are glycidyl acrylate, glycidyl methacrylate and maleic anhydride. These compounds may be used in a mixture thereof.

The component (B) is used in an amount of from 0.1 to 20 parts by weight, and preferably from 0.5 to 10 parts by weight, based on 100 parts by weight of the polypropylene resin (A). When the amount is less than 0.1 part by weight, the amount of the grafted component (B) on the polypropylene resin may be low. When the amount exceeds 20 parts by weight, a large amount of the unreacted component (B) remains in the acid modified polypropylene resin obtained, and as a result, the acid modified polypropylene resin may be insufficient in its properties such as adhesive property.

The component (C) used in the present invention is an organic peroxide having a decomposition temperature of from 50 to 120° C., and preferably from 70 to 110° C., at which temperature a half-life thereof is 1 minute. When an organic peroxide having a decomposition temperature of lower than 50° C. is used, the graft reaction of the component (B) hardly proceeds. When an organic peroxide having a decomposition temperature of higher than 120° C. is used, decomposition of the polypropylene resin is easily accelerated.

As the component (C), preferred are those which can decompose to generate a radical, and then can draw a proton from the polypropylene resin. Examples of the component (C) are diacyl peroxide compounds, percarbonate compounds having the following structure (1) in its molecule, and alkyl perester compounds having the following structure (2) in its molecule.

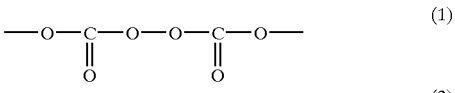

(1)

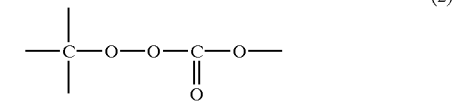

(2)

Specific examples of the above-mentioned percarbonate compounds are di-3-methoxybutyl peroxydicarbonate, di-2-ethylhexyl peroxydicarbonate, bis(4-t-butylcyclohexyl) peroxydicarbonate, diisopropyl peroxycarbonate, t-butyl peroxyisopropylcarbonate and dimyristyl peroxycarbonate. Specific examples of the above-mentioned alkyl perester compounds are 1,1,3,3-tetramethylbutyl neodecanoate, α-cumyl peroxyneodecanoate and t-butyl peroxyneodecanoate. Of these, preferred are percarbonate compounds, which can draw a proton from the polypropylene resin.

The component (C) is blended in an amount of from 0.01 to 20 parts by weight, and preferably from 0.02 to 10 parts by weight, based on 100 parts by weight of the component (A). When the amount is less than 0.01 part by weight, the graft reaction of the component (B) hardly proceeds. When the amount exceeds 20 parts by weight, decomposition of the polypropylene resin is easily accelerated.

The component (D) used in the present invention is an organic peroxide having a decomposition temperature of from 150 to 200° C., and preferably from 160 to 200° C., at which temperature a half-life thereof is 1 minute. When an organic peroxide having a decomposition temperature of lower than 150° C. is used, the graft reaction of the component (B) hardly proceeds. When an organic peroxide having a decomposition temperature of higher than 200° C. is used, decomposition of the polypropylene resin is easily accelerated.

Specific examples of the component (D) are 1,1-bis(t-butylperoxy)cyclohexane, 2,2-bis(4,4-di-t-butylperoxycyclohexyl)propane, 1,1-bis(t-butylperoxy)cyclododecane, t-hexylperoxyisopropyl monocarbonate, t-butylperoxy-3,5,5-trimethyl hexanoate, t-butyl peroxylaurate, 2,5-dimethyl-2,5-di(benzoylperoxy)hexane, t-butyl peroxyacetate, 2,2-bis(t-butylperoxy)butene, t-butyl peroxybenzoate, n-butyl-4,4-bis(t-peroxy) valerate, di-t-butyl peroxyisophthalate, dicumyl peroxide, á,á'-bis(t-butylperoxy-m-isopropyl)benzene, 2,5-dimethyl-2,5-di(t-butylperoxy)hexane, 1,3-bis(t-butylperoxydiisopropyl)benzene, t-butylcumyl peroxide, di-t-butyl peroxide, p-methane hydroperoxide and 2,5-dimethyl-2,5-di(t-butylperoxy)hexyne-3.

The component (D) is blended in an amount of from 0.01 to 20 parts by weight, and preferably from 0.03 to 1.0 part by weight, based on 100 parts by weight of the component (A). When the amount is less than 0.01 part by weight, the graft reaction of the component (B) hardly proceeds. When the amount exceeds 20 parts by weight, decomposition of the polypropylene resin is easily accelerated.

If desired, respective components used in the present invention may be used in combination with additives such as an electron donor compound such as styrene and divinylbenzene, and a conventional additive for a polypropylene resin such as an antioxidant, a heat resistant stabilizer and a neutralizing agent.

A method of kneading respective components used in the present invention is not limited, and may be a method known in the art. A preferable method comprises the steps of (1) mixing respective components in a mixing machine such as a Henschel mixer, a ribbon blender and a blender to obtain a mixture, and (2) kneading the mixture in a kneading machine such as a Banbury mixer, a plastomil, a Brabender plastograph, a single screw extruder and a twin screw extruder. Of these, from a viewpoint of continuous production to obtain a high productivity, particularly preferred are methods using a single or twin screw extruder. How to feed respective components to the mixing machine or the kneading machine is not limited. In feeding, the components may be fed at one time, or divided into some portions, each of which is fed one by one.

A kneading temperature, for example, a cylinder temperature of an extruder, is from 50 to 300° C., and preferably from 100 to 250° C. When the kneading temperature is lower than 50° C., an amount of a grafted unsaturated carboxylic acid or a grafted derivative may not increase. When it is higher than 300° C., the resin may decompose. A kneading period of time is from 0.1 to 30 minutes, and particularly preferably from 0.5 to 5 minutes. When the kneading period of time is shorter than 0.1 minute, an amount of grafted unsaturated carboxylic acid or a grafted derivative may be decrease. When the kneading period of time is longer than 5 minutes, the resin may decompose.

EXAMPLE

The present invention is explained with reference to the following Examples, which do not limit the scope of the present invention.

Example 1

To 100 parts by weight of a powder form ethylene/propylene random copolymer having an intrinsic viscosity [η] of 3.0 dl/g and a propylene unit content of 99.8% by weight, 1.0 part by weight of maleic anhydride, 1.0 part by weight of styrene, 0.05 part by weight of dicetyl peroxydicarbonate, 0.05 part by weight of calcium stearate and 0.3 part by weight of tetraxis[methylene-3-(3,5-di-t-butyl-4-hydroxyphenyl)propionate]methane (an antioxidant) were added. The mixture obtained was pre-mixed thoroughly, and was kneaded using a twin screw extruder (L/D=25, a cylinder diameter=20 mm), Type 2D25-S, manufactured by Toyo Seiki Co., Ltd. under conditions of a cylinder temperature of 200° C. and a screw rotating speed of 70 rpm, thereby obtaining an acid modified polypropylene resin. The results are as shown in Table 1.

Example 2

Example 1 was repeated to obtain an acid modified polypropylene resin, except that the amount of maleic anhydride was changed to 2.0 parts by weight and no styrene was used. The results are as shown in Table 1.

Comparative Example 1

Example 1 was repeated except that no organic peroxide was used. The results are as shown in Table 1.

Comparative Example 2

Example 1 was repeated except that the organic peroxide was changed to 1,3-bis(t-butylperoxyisopropyl)benzene. The results are as shown in Table 1.

Comparative Example 3

Example 2 was repeated except that the organic peroxide was changed to 1,3-bis(t-butylperoxyisopropyl)benzene. An MFR (Melt Flow Rate) of the reaction product increased remarkably to fail to draw a strand steadily, and as a result, an amount of the grafted maleic acid could not be measured. The results are as shown in Table 1.

Example 3

To 100 parts by weight of an ethylene/propylene heterophasic copolymer having an intrinsic viscosity [η] of 2.8 dl/g, an ethylene/propylene random copolymer portion content of 21% by weight and a propylene homopolymer portion content of 79% by weight, 2.0 parts by weight of maleic anhydride, 0.50 part by weight of di-cetyl peroxydicarbonate, 0.15 part by weight of 1,3-bis(t-butylperoxydiisopropyl)benzene, 0.05 part of calcium stearate and 0.3 part by weight of tetraxis[methylene-3-(3,5-di-t-butyl-4-hydroxyphenyl)propionate]methane (an antioxidant) were added. The mixture obtained was pre-mixed thoroughly, and was kneaded using a twin screw extruder (L/D=41, a cylinder diameter=53 mm), Type TEM-50A, manufactured by Toshiba Machine Co., Ltd. under conditions of a cylinder temperature of 200° C. and a screw rotating speed of 240 rpm, thereby obtaining an acid modified polypropylene resin. The results are as shown in Table 2.

Comparative Example 4

Example 3 was repeated except that no di-cetyl peroxydicarbonate was used. The results are as shown in Table

TABLE 1

| | Example | | Comparative Example | | |
|---|---|---|---|---|---|
| | 1 | 2 | 1 | 2 | 3 |
| Components | | | | | |
| (A) Polypropylene resin | 100 | 100 | 100 | 100 | 100 |
| (B) Maleic anhydride | 1.0 | 2.0 | 1.0 | 1.0 | 2.0 |
| (C) Organic peroxide | | | | | |
| C-1 (Note 1) | 0.05 | 0.50 | — | — | — |
| C-2 (Note 2) | — | — | — | 0.05 | 0.50 |
| Styrene | 1.0 | — | 1.0 | 1.0 | — |
| Evaluation | | | | | |
| MFR (g/10 min.) (Note 3) | 0.5 | 0.2 | 0.6 | 3.4 | — |
| Amount of grafted maleic anhydride (wt %) (Note 4) | 0.24 | 0.24 | — | 0.18 | — |

Note 1: Di-cetyl peroxydicarbonate (a temperature at which its half-life is 1 minute = 99° C.).
Note 2: 1,3-Bis(t-butylperoxyisopropyl)benzene (a temperature at which its half-life is 1 minute = 183° C.).
Note 3: MFR was measured at a temperature of 230° C. under a load of 21.2 N according to JIS K7210.
Note 4: The amount of grafted maleic anhydride was measured according to a method comprising the steps of:
(1) dissolving 1 gram of a sample resin in 100 ml of xylene to obtain a solution,
(2) dropping the solution into 1000 ml of methanol under stirring to re-precipitate the resin,
(3) separating the resin re-precipitated by filtration,
(4) drying the resin separated in vacuo at 80° C. for 8 hours,
(5) hot-pressing the resin dried to obtain a film having a thickness of 100 μm,
(6) measuring an infrared absorption spectrum of the film, and
(7) determining an amount of grafted maleic acid (% by weight; a total amount of the resin is assigned to be 100% by weight) from the absorption near 1780 cm$^{-1}$.

TABLE 2

| | Example 3 | Comparative Example 4 |
|---|---|---|
| Components | | |
| (A) Polypropylene resin | 100 | 100 |
| (B) Maleic anhydride | 2.0 | 2.0 |
| (C) Organic peroxide C-1 (Note 1) | 0.50 | — |
| (D) Organic peroxide D-1 (Note 5) | 0.15 | 0.15 |
| Evaluation | | |
| Production stability (Note 6) | ○ | X |
| Amount of grafted maleic anhydride (wt %) (Note 4) | 044 | 0.29 |

Note 1:
The same as in Table 1.
Note 4:
The same as in Table 1.
Note 5:
1,3-Bis(t-butylperoxyisopropyl) benzene (a temperature at which its half-life is 1 minute = 183° C.).
Note 6:
Production stability is marked with "○" when the strand of the acid modified polypropylene resin could be drawn steadily from the twin screw extruder, and marked with "X" when it was not so.

What is claimed is:

1. A process for producing an acid modified polypropylene resin, which comprises the step of kneading:

(1) 100 parts by weight of a polypropylene resin (A), (2) 0.1 to 20 parts by weight of an unsaturated carboxylic acid or a derivative thereof (B), and (3) 0.01 to 20 parts by weight of an organic peroxide (C) having a decomposition temperature of from 50 to 120° C., at which a half-life of the organic peroxide is 1 minute.

2. The process for producing an acid modified polypropylene resin according to claim 1, wherein the organic peroxide (C) contains a compound having the following structure (1) in its molecule:

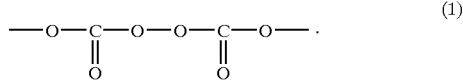

(1)

3. The process for producing an acid modified polypropylene resin according to claim 1, wherein the kneading is carried out with an extruder.

4. A process for producing an acid modified polypropylene resin, which comprises the step of kneading:

(1) 100 parts by weight of a polypropylene resin (A), (2) 0.1 to 20 parts by weight of an unsaturated carboxylic acid or a derivative thereof (B), (3) 0.01 to 20 parts by weight of an organic peroxide (C) having a decomposition temperature of from 50 to 120° C., at which a half-life of the organic peroxide is 1 minute, and (4) 0.01 to 20 parts by weight of an organic peroxide (D) having a decomposition temperature of from 150 to 200° C., at which a half-life of the organic peroxide is 1 minute.

5. The process for producing an acid modified polypropylene resin according to claim 4, wherein the organic peroxide (C) contains a compound having the following structure (1) in its molecule:

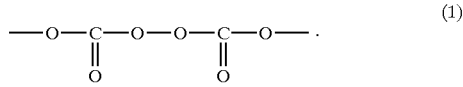

(1)

6. The process for producing an acid modified polypropylene resin according to claim 4, wherein the kneading is carried out with an extruder.

* * * * *